United States Patent [19]

Buttke et al.

[11] Patent Number: 4,950,459
[45] Date of Patent: Aug. 21, 1990

[54] VAPOR COLLECTION AND PROCESS FOR EBULLATED BED REACTORS

[75] Inventors: Robert D. Buttke, Lisle; John R. Frey, Aurora, both of Ill.

[73] Assignee: Amoco Corporation, Chicago, Ill.

[21] Appl. No.: 249,605

[22] Filed: Sep. 26, 1988

Related U.S. Application Data

[62] Division of Ser. No. 87,394, Aug. 20, 1987, Pat. No. 4,804,458.

[51] Int. Cl.$^5$ .......................... B01D 19/00; B01J 9/16
[52] U.S. Cl. .................................. 422/220; 422/216; 208/143
[58] Field of Search ............... 208/143, 146, 157, 113; 422/140, 147, 217, 216, 220

[56] References Cited

U.S. PATENT DOCUMENTS

| | | | |
|---|---|---|---|
| 3,197,288 | 7/1905 | Johanson | 422/140 |
| 3,523,763 | 8/1970 | Van Driesen et al. | 422/140 |
| 3,523,888 | 8/1970 | Stewart et al. | 208/143 X |
| 3,630,687 | 12/1961 | Van Driesen | 208/157 X |
| 3,698,876 | 10/1972 | Gregoli et al. | 208/143 X |
| 4,684,456 | 8/1987 | Van Driesen et al. | 208/146 X |

Primary Examiner—Glenn Caldarola
Attorney, Agent, or Firm—Gary J. Cunningham; William H. Magidson; Ralph C. Medhurst

[57] ABSTRACT

A vapor collector and process utilizes a skirted pan to collect vapor in an ebullated bed reactor and substantially minimize gas entrainment so as to enhance the efficiency and yield of resid hydrotreating.

20 Claims, 5 Drawing Sheets

VAPOR COLLECTION AND PROCESS FOR EBULLATED BED REACTORS

This is a division, of application Ser. No. 087,394, filed Aug. 20, 1987, now U.S. Pat. No. 4,804,458.

BACKGROUND OF THE INVENTION

This invention relates to resid hydrotreating and, more particularly, to an improved hydrotreating process and novel ebullated bed reactor equipped with a vapor collector.

In the past, spiralling oil costs, extensive price fluctuations, and artificial output limitations by the Cartel of Oil Producing Countries (OPEC) have created instability and uncertainty for net-oil consuming countries such as the United States. It is desirable to attain adequate supplies of high-quality, low-sulfur, petroleum crude oil (sweet crude) from Saudi Arabia, Nigeria, Norway, and other countries at reasonable prices for conversion into gasoline, fuel oil, and petrochemical feedstocks. In an effort to stablize the supply and availability of crude oil at reasonable prices, Amoco Oil Company has developed, constructed, and commercialized extensive refinery projects to process poor quality, high-sulfur, petroleum crude oil and demetallate, desulfurize, and hydrocrack resid to produce high-value products, such as gasoline, distillates, catalytic cracker feed, metallurgical coke, and petrochemical feedstocks. Thus, it is Amoco Oil Company's goal to provide adequate supplies of gasoline and other petroleum products at reasonable prices.

During resid hydrotreating, residual oil (resid) is upgraded with hydrogen and a hydrotreating catalyst in a three-phase mixture of oil, catalyst, and vapor or gas bubbles to produce more valuable, lower-boiling liquid products. In order to increase the efficiency, effectiveness, and profitability of resid hydrotreating, it is desirable to maximize the conversion of resid to more valuable lower boiling liquid products. The extent of conversion of resid to more valuable lower-boiling liquid products depends in part on the residence time of the resid in the reactor, and the effective volume of the reactor itself.

In ebullated (expanded) bed reactors, the reactor oil and catalyst bed are fluidized, ebullated, and expanded. Since the reactor oil does not usually have enough velocity to expand the catalyst bed above its settled level, the reactor oil is recycled in the reactor, such as through a downcomer via an ebullating pump. During recycling, excessive gas (vapor) can be entrained in the recycled reactor oil. This can lead to high internal recirculation of gas which can cause high gas holdup and gas (vapor) bubbles in the reaction zone, impair operation of the recycle pump, and create other problems as explained below.

In the normal operation of ebullated bed reactors, there are substantial amounts of vapors or gas bubbles comprising excess hydrogen, light hydrocarbon gases, hydrogen sulfide, ammonia, steam, etc. emitted in the reaction zone. Excess vapors and gas bubbles can lower process efficiency, decrease product yield and cause various problems. First, they occupy a substantial portion of the overall volume of the reaction zone of the ebullated bed reactor that could be more effectively used to upgrade the oil feed. Second, a substantial portion of the liquid and vapors (gas bubbles) are recycled and recirculated through the downcomer and the ebullating pump, lowering pump efficiency and compounding the problem of occupying an even greater proportion of the overall volume of the reaction zone. The vapor and gas bubbles can also interrupt the smooth operation of the ebullating pump. The prior art reactors and processes do not solve this problem. Furthermore, vapors and gas bubbles in the oil feed materially decrease the capacity and effective volume of ebullated bed reactors, thus decreasing hydrotreating efficiency, prolonging the process in which it takes to produce upgraded oil, and adding to overall costs of producing oil.

Additional unsolved problems plaguing prior art reactors and processes are gas entrainment, gas holdup, and gas recycle. High gas entrainment causes the ebullating pump to be run at very high pump speeds, which constrains reactor operation. Recycle flow instability occurs at higher gas and liquid recycle rates where gas entrainment and internal gas recycle rates are high. High gas recycle may cause rapid changes in gas holdup in both the ebullated bed reactor and the downcomer. When this takes place, the pump inlet and outlet pressures vary widely and make it difficult to control flow rates and avoid catalyst slumping or carry over. Gas entrainment and the resulting internal gas recycle increase gas holdup and reduce the reactor liquid volume necessary for thermal reactions like resid conversion and thermal-catalytic reactions like Ramscarbon conversion.

Over the years a number of reactors and processes have been suggested for processing oil. Typifying these prior art reactors and processes are those found in U.S. Pat. Nos. 3,124,518, 3,227,528, 3,414,386, 3,677,716, 4,057,397, 4,097,243, 4,221,653, and Re. 25,770. These prior art reactors and processes have met with varying degrees of success.

U.S. Pat. No. 3,414,386, entitled, "Reaction Vessel for Improved Temperature Regulation In Exothermic Reactions" to Mattix, discloses a reactor having a recycle conduit with an enlarged upper end in peripheral contact with the reactor wall to block and prevent fluid flow between the enlarged upper end of the recycle conduit and the reactor wall. The reactor has conduits which extend from a position below the enlarged upper end of the recycle conduit to above the liquid level. Each of the conduits has an overhead deflector plate or cap to deflect the fluids back into the enlarged upper end of the recycle conduit.

U.S. Pat. No. 4,221,653 entitled, "Catalytic Hydrogenation Process and Apparatus With Improved Vapor Liquid Separation" to Chervenak et al., discloses upper portions of downcomers with staggered liquid and gas conduits. Most of the conduits have inlet ends at different levels extending below the upper portions of the downcomer and have outlet ends submerged in the liquid below the liquid level (surface of the liquid).

It is, therefore, desirable to provide an improved hydrotreating process and reactor which overcomes most, if not all, of the above problems.

SUMMARY OF THE INVENTION

An improved hydrotreating process and ebullated bed reactor equipped with a unique vapor collector is provided which is efficient, effective and economical. Advantageously, the novel process and reactor improve product yield and increase the conversion of resid (residual oil) to more valuable lower-boiling liquid products such as naphtha (gasoline). They further enhance profitability by substantially minimizing gas entrainment in the recycle reactor oil and increasing the useful volume in the reaction zone.

The novel ebullated bed reactor has a feed line which feeds a mixture comprising oil and hydrogen-rich gases into the vessel of the reactor and a fresh catalyst feed line which feeds fresh hydrotreating catalyst into the reactor to form a catalyst bed. The feed is circulated in the vessel and the catalyst bed is expanded by an ebullating pump located in the lower portion of the reactor. A tubular downcomer extends generally upwardly above the ebullating pump. A stationary tubular pan is connected to the upper end of the downcomer in the upper portion of the vessel to separate vapor from the recycle reactor oil flowing into the downcomer. Desirably, an annular skirt is connected to the pan and extends downwardly and outwardly therefrom for collecting vapor in the upper portion of the reaction zone.

In the novel hydrotreating process, a hydrotreating catalyst is fed into an ebullated bed reactor. The oil and hydrogen-rich gases comprising the feed are fed into the reactor and mixed together in the presence of a catalyst to produce upgraded oil. The recycle liquid (reactor oil) is directed generally downwardly through the recycle pan and downcomer. In order to minimize gas entrainment in the recycle liquid, vapor or gas bubbles in the reaction zone are trapped and caught at a predetermined position below the upper surface of the liquid (i.e. below the liquid level) and directed or injected into a vapor containing space above the liquid level.

A more detailed explanation of the invention is provided in the following description and the appended claims taken in conjunction with the accompanying drawings.

DETAILED DESCRIPTION OF THE PREFERRED EMBODIMENT

Figure 1:
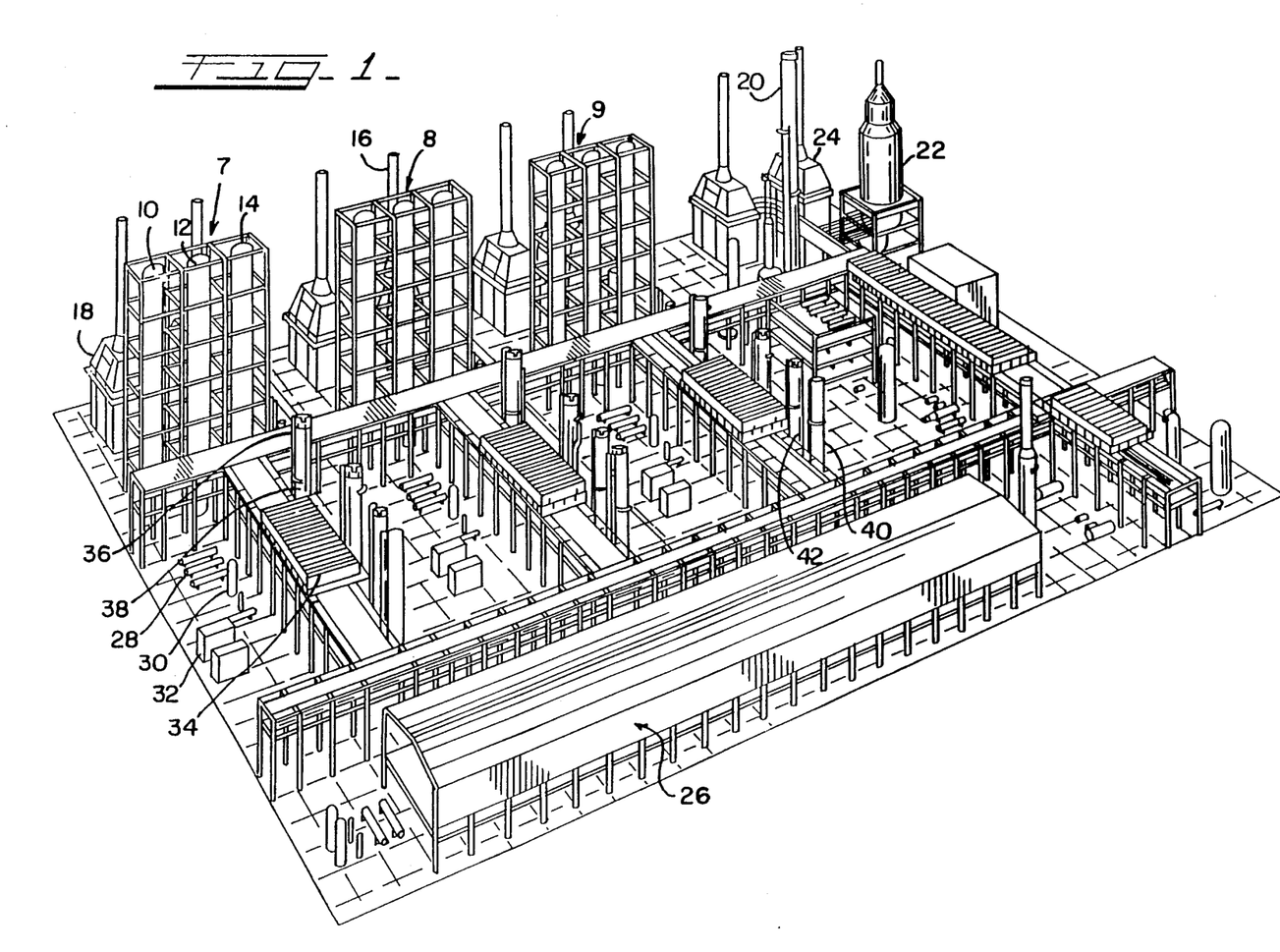
FIG. 1 is a perspective view of resid hydrotreating units and associated refinery equipment for carrying out the process.

High-sulfur residual oil feed, also referred to as vacuum-reduced crude, comprising 1,000+° F. resid and heavy gas oil, is fed into resid hydrotreating units (RHU) 7, 8, 9 (FIG. 1) along with a hydrogen-rich feed gas. Each resid hydrotreating unit is a reactor train comprising a cascaded series or set of three ebullated (expanded) bed reactors 10, 12, and 14. In the reactors, the resid is hydroprocessed (hydrotreated) in the presence of fresh and/or equilibrium hydrotreating catalyst and hydrogen to produce an upgraded effluent product stream with reactor tail gases (effluent off gases) leaving used spent catalyst. Hydroprocessing in the RHU includes demetalation, desulfurization, denitrogenation, resid conversion, oxygen removal (deoxygenation), and removal of Rams carbon.

The resid hydrotreating units and associated refining equipment (FIG. 1) comprise three identical parallel trains of cascaded ebullated bed reactors 10, 12, and 14, as well as hydrogen heaters 16, influent oil heaters 18, an atmospheric tower 20, a vacuum tower 22, a vacuum tower oil heater 24, a hydrogen compression area 26, oil preheater exchangers 28, separators 30, recycled gas compressors 32, air coolers 34, raw oil surge drums 36, sponge oil flash drums 38, amine absorbers and recycle gas suction drums 40, and sponge oil absorbers and separators 42.

Each of the reactor trains comprises three ebullated bed reactors in series. The oil feed typically comprises resid oil (resid) and heavy gas oil. The feed gas comprises upgraded recycle gases and fresh makeup gases. Demetalation primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a hydrogenating component on a porous refractory, inorganic oxide support.

The resid hydrotreating unit is quite flexible and, if desired, the same catalyst can be fed to one or more of the reactors or a separate demetalation catalyst can be fed to the first reactor while a different catalyst can be fed to the second and/or third reactors. Alternatively, different catalysts can be fed to each of the reactors, if desired. The used spent catalyst typically contains nickel, sulfur, vanadium, and carbon (coke). Many tons of catalyst are transported into, out of, and replaced in the ebullated bed reactors daily.

The products produced from the resid hydrotreating units in the ebullated bed reactors include light hydrocarbon gases, light naphtha, intermediate naphtha, heavy naphtha, light distillate, mid-distillate, light gas oil, vacuum naphtha, light vacuum gas oil, heavy vacuum gas oil, and hydrotreated vacuum resid. Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst. Light and heavy vacuum gas oils and light gas oil are useful as feedstock for a catalytic cracker. The vacuum resid can be sent to cokers to produce coke.

Figure 2:
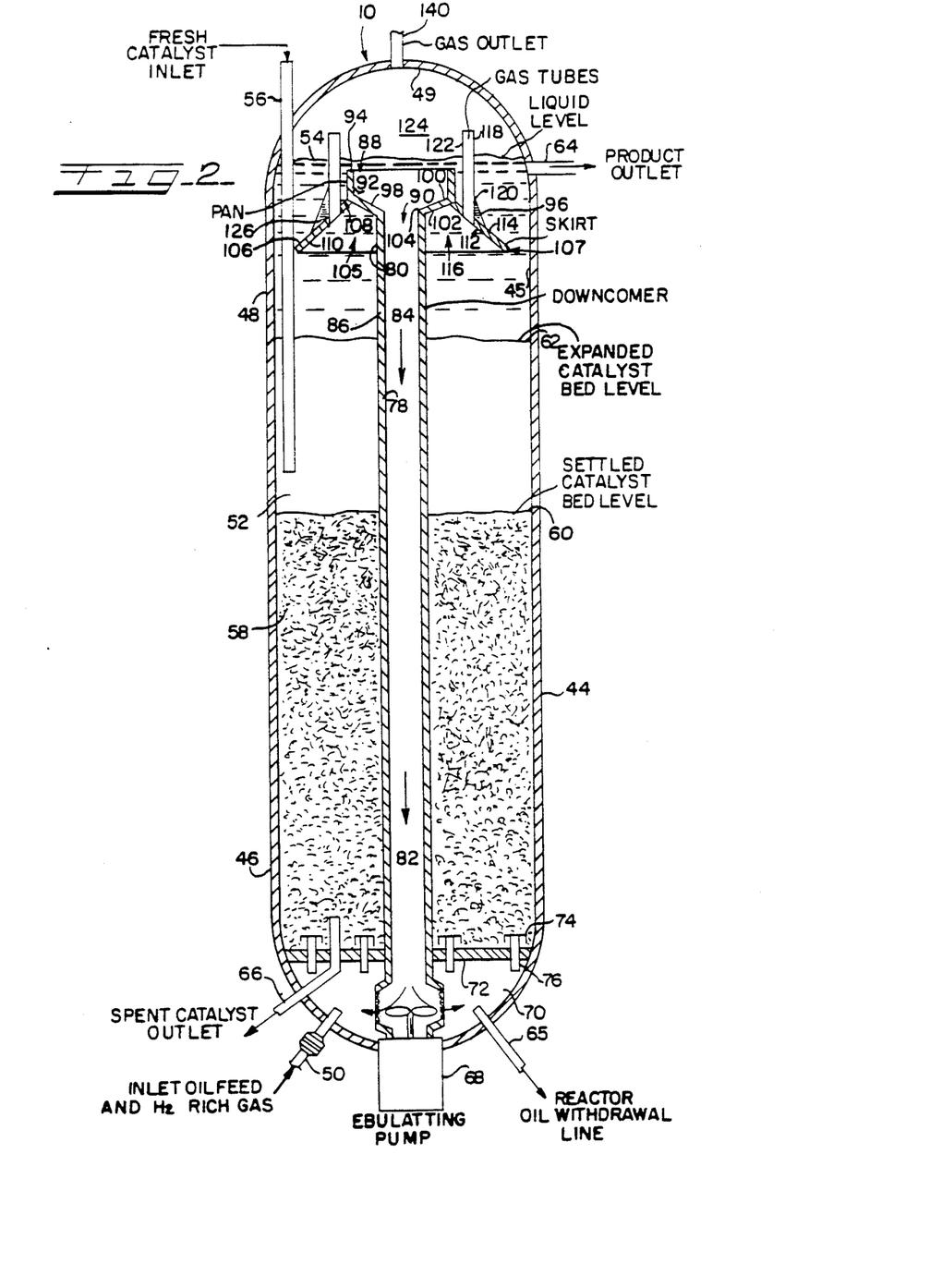
FIG. 2 is a cross-sectional view of the ebullated bed reactor equipped with a vapor collector in accordance with the present invention.

The ebullated bed reactor 10, as illustrated in FIG. 2, also sometimes referred to as an expanded bed reactor, includes an upright elongated vessel 44 with an upright wall 45, a lower portion 46 and an upper portion 48 with a top, roof or dome 49. An oil feed line 50, conduit or pipe, feeds an oil feed comprising resid (resid oil) and hydrogen-rich gases into the reaction zone 52 in the lower portion 46 of the vessel 44. The oil feed in the reactor is also sometimes referred to in this Application as reactor oil or liquid. The top surface of the liquid (reactor oil) in the reactor 10 is referred to as the liquid level 54. A catalyst feed line, conduit or pipe 56 feeds fresh or replacement hydrotreating catalyst into the upper portion 48 of the reaction zone 52 to form a catalyst bed 58 in the vessel 44. The catalyst bed 58 is expandable from a settled bed level 60 to an expanded catalyst bed level 62. The upgraded oil produced in the vessel 44 is withdrawn through an upper product outlet pipe or withdrawal line 64. Alternatively, a lower product outlet, pipe or withdrawal line 65 can withdraw the product near the surface of the liquid level 54 and discharge the product out of the reactor near the lower portion 46 of the vessel 44. The lower product outlet pipe 65 can extend downwardly along the upright wall 45 of the vessel 44 in the reaction zone 52 through the distribution plate 72.

The catalyst can be carried through the catalyst feed line 56 with gas oil. A spent catalyst outlet, withdrawal line, conduit or pipe 66 withdraws spent catalyst from the lower portion 46 of the vessel 44. The oil-slurried hydrotreating catalyst enhances the flexibility of the ebullated bed reactors and permits the addition or withdrawal of oil/catalyst slurry without taking the reactors offstream. Regular catalyst replacement is helpful to maintain adequate catalyst activity.

Ebullated bed reactors have many advantages over fixed bed reactors. They permit operation at higher average temperatures. They permit the addition and withdrawal of catalyst without necessitating shutdown. They avoid plugging due to dirty feed and help minimize formation of solids during resid conversion. Ebullated bed reactors may be operated at extremely high temperatures and pressures.

Since the liquid resid feed does not usually have enough velocity to expand the catalyst bed above its settled level, liquid is recycled from the upper portion 48 of the reactor 10 to the bottom of the reactor 10 through a vertical downcomer, pipe or recycle line 78 and then pumped back up and circulated through the reaction zone 52 of the reactor 10 to keep the catalyst bed fluidized, and at a sufficient velocity to attain the required degree of expansion.

An ebullating pump 68 is located in the lower portion 46 of the vessel 44, for controlling, expanding and varying the height of the catalyst bed 58 as well as for circulating the oil.

Liquid recycle flow rates and the catalyst bed 58 level in reactors are controlled by varying the speed of the ebullating pump 68. The speed of the pump can range from about 400 to 1800 RPM.

High gas entrainment causes high pump speeds. Head requirements for the ebullating pump 68 rise rapidly with increased gas entrainment. With more gas present, the pump inlet pressure falls due to lower hydrostatic head across the downcomer 78. To counteract the lower inlet pressure, the centrifugal ebullating pump 68 has to deliver more head (pressure) through increased speed.

The lower portion 46 of the reactor includes a bottom section 70 with a horizontal distributor plate 72 which separates the reaction zone 52 from the bottom section 70 of the reactor 10. The distributor plate 72 has a multitude of bubble caps 74 and risers 76 which direct the flow of oil and hydrogen-rich gases upward to the reaction zone 52, while preventing flow of catalyst downward to the bottom section 70.

An elongated stationary tubular downcomer 78 extends generally upward above the ebullating pump 68. The downcomer 78 has an upper end portion 80 and a lower end portion 82. The upper end portion 80 of the downcomer 78 also has an inner surface 84 and outer surface 86.

A stationary annular recycle pan 88 facilitates and controls the flow of the liquid or oil feed (reactor oil) into the downcomer 78 either when the height of the catayst bed 54 is varied or constant, and recycles internally the oil feed through the ebullating pump 68 and through the reaction zone 52. The recycle pan 88 serves as the second stage of the separator to help disengage or separate the gas from the liquid or oil feed and helps decrease entrainment of the recycle liquid or oil feed entering the downcomer 78. The large diameter of the recycle pan 88 decreased the velocity of the downflowing liquid, making it easier for gas bubbles and vapors to escape entrainment.

The recycle pan 88 is fabricated out of a metal, such as stainless steel, which resists corrosion from the oil feed, gases and products produced in the reactor 10 and which substantially maintains its structural integrity and strength at hydrotreating conditions.

The recycle pan 88 (FIGS. 2 and 3) has an inner circular feed passageway 90 and is generally funnel-shaped. The recycle pan 88 has a substantially circular upright wall 92 with a top portion 94 and bottom portion 96. A recycle pan 88 wall 92 height of about 12 inches is useful to achieve a more uniform liquid flow profile inside the pan 88. The pan 88 has an inwardly sloping flared lower pan wall 98 (FIG. 3), with an inner surface 100 and an outer surface 102, comprising an annular inwardly sloping frustoconical flared wall extending downwardly and inwardly at an angle of inclination from the bottom portion 96 of the upright wall 92. The sloping wall 98 extends downwardly and inwardly at an angle of inclination ranging from about 30° to 60° in relation to the vertical axis, and preferably from about 40° to 50°. A bottom edge 104 of the sloping pan wall 98 is attached to and above the upper end portion 80 of the downcomer 78.

A stationary flared annular frustoconical rigid skirt 106 (FIG. 2) is fixedly attached to the bottom edge 104 of the upright wall 92 of the recycle pan 88, and extends downwardly and outwardly therefrom to a position spaced inwardly from the upright wall 45 of the vessel 44. The skirt 106 is fabricated out of a metal, such as stainless steel, which resists corrosion from the oil feed, gases and products produced in the vessel 44 and which substantially maintains its structural integrity and strength at hydrotreating conditions.

The skirt 106 extends downwardly and radially outwardly at an angle of inclination ranging from about 5° to 45° in relation to the vertical axis, preferably from about 5° to 25°, and most preferably at 20° in relation to the vertical axis for best results. Since this angle far exceeds the catalyst friction angle, catalyst should freely slide off the upper surface 114 of the skirt 106. The skirt 106 has a smaller outside diameter than the inside diameter of the upright wall 45 of the vessel 44 so as to provide an annular circular passage or gap 107 therebetween.

The annular passageway or gap 107 must be large enough to allow the liquid (reactor oil) to freely flow, circulate and pass upwardly through the passage 107 while allowing large clumps of catalyst or coke reciprocatingly to pass downwardly through the passage 107 and return back to the expanded catalyst bed level 62. Test results indicate that decreasing the span (width) and cross-sectional area of the passage 107 by enlarging and increasing the width and cross-sectional area of the skirt 106, improved gas separation performance and reduced gas holdup by as much as a factor of two around the pan 88.

One of the reasons why performance improved with decreasing passage 107 width was the change in the projected area of the skirt 106 and vapor collector 105. With a smaller passage, the skirt 106 and vapor collector 105 occupied a larger cross-sectional area, increasing its capability of capturing gas and conveying it to the conduits 118. The other reason for improved performance was the "channeling" effect where the narrow passage 107 directed gas to a channel along the vessel 44 wall 45 where it could more readily bypass the recycle pan 88.

The minimum passage 107 width between the inner reactor wall 45 and the outer edge of the skirt 106 is a compromise between a desire to improve gas disengagement and a desire to minimize the risks associated with catalyst and coke deposits. The passage 107 must be large enough to prevent large clumps of catalyst or coke to wedge into the annulus gap formed by skirt 106 and the vessel 44 wall 45. The preferred width of the passage 107 in one reactor was nine inches, to minimize this possibility.

Increasing the depth of the skirt 106 provides a vapor collector 105 with a greater cross-sectional area and greater volume. Test results have shown that a deeper skirt 106, such as from 10 inches to 14 inches, allows 4 to 6 volume percent less gas, vapor, and bubbles into the downcomer 78. With a larger cross-sectional area, the skirt 106 and vapor collector 105 provide a larger pocket 116 for the capture and collection of vapor (gas bubbles). A deeper skirt 106 and vapor collector 105 also provide more residence time for the disengagement or separation of gas and liquid. The term "vapor," for purposes of this application, refers to and comprises excess hydrogen, light hydrocarbon gases, hydrogen sulfide, ammonia, steam, etc. emitted in the reaction zone.

Gas separation improved significantly as the skirt 106 became deeper and wider. However, there are mechanical constraints because if the skirt 106 depth extends and contacts the expanded catalyst bed level 62, accumulation of coke, asphaltenes, catalysts, and other solids can adhere to the skirt 106, lowering the efficiency of the ebullated bed reactor and hydrotreating process. Extending the skirt into the catalyst also makes it difficult to control the catalyst bed level.

The skirt 106 (FIG. 3) has an upper portion 108 and a lower portion 110. The slanted span of the skirt 106 can be about 24 inches wide. The skirt 106 has a downwardly facing bottom skirt surface 112 and an upwardly facing upper surface 114. The bottom surface 112 of the skirt 106 provides a deflector and baffle for deflecting the rising gas bubbles or vapor in the reaction zone 52. The bottom surface 112 of the skirt cooperates with the inwardly sloping wall 98 of the recycle pan 88, to define an annular inverted V-shaped bubble-receiving pocket 116 for catching, trapping, and receiving a substantial amount of vapor and gas bubbles entrained in the oil feed and deflecting the collected vapor and gas bubbles upwardly through vapor risers or vertical conduits 118.

The vapor collector 105 and pan 88 provide a two-stage separator to reduce gas entrainment in the recycle liquid (reactor oil) and gas holdup in the reaction zone 52. The first stage of the vapor collector 105, collects, pockets, disengages and separates the vapor and gas bubbles in the liquid (reactor oil) above the reaction zone 52. The second stage recycle pan 88 further disengages and separates the vapor and gas bubbles from the oil feed inside and in proximity to the recycle pan 88.

The vapor collector and assembly 105 include: (1) the flared annular frustoconical skirt 106; (2) the inwardly sloping wall 98 of the recycle pan 88; (3) the annular inverted bubble-receiving pocket 116 between the skirt 106 and the pan wall 98 for catching, trapping, and receiving vapors and gas bubbles in the oil feed and reaction zone; and (4) the vertical conduits 118 which provide a passageway for transporting the collected vapor and gas bubbles away from the pocket 116 into the vapor space 124 at the top 49 (FIG. 2) of the vessel 44.

Test results indicate that the skirt 106 and vapor collector 105 reduced gas holdup around the recycle pan 88 by a factor of two or more. As the skirt 106 became wider and the passage 107 between the skirt 106 and wall 45 of the vessel 44 became narrower, more gas flowed through the conduits 118, and gas holdup around the recycle pan 88 dropped.

Reducing gas holdup around the pan 88 benefited separation in two ways. As gas holdup around and inside the recycle pan 88 declined, bubbles and vapors rose faster increasing the effectiveness of the second stage of separation inside the recycle pan 88. The other effect is related to gas concentration. Lower gas concentration or holdup means there is less gas to entrain. Thus, there is a correlation between gas holdup around the recycle pan 88 and gas entrainment in the downcomer 78. At a constant liquid recycle rate, gas entrainment in recycle liquid rose sharply as gas holdup around the pan 88 increased.

The skirt 106 and vapor collector 105 not only reduced gas holdup in the downcomer (recycle line) 78 and in the region around the recycle pan 88, but it also reduced gas holdup in the reaction zone 52 of the reactor 10. Gas holdup declined overall because less gas was recycled internally, and gas velocities dropped in the upflow region in the reaction zone 52 of the vessel 44.

One series of tests indicated that the skirt 106 and vapor collector 105 decreased gas holdup in the reaction zone from about 35 volume percent to 30.5 volume percent.

A reduction in reactor gas holdup has significant impact on resid conversion. A 4 volume percent reduction in gas holdup is equivalent to a 2 percentage point increase in resid conversion because of the increased liquid volume available for thermal reactions. This increased liquid volume also increases Ramscarbon conversion since this reaction also depends on thermal reactions.

Figure 5:
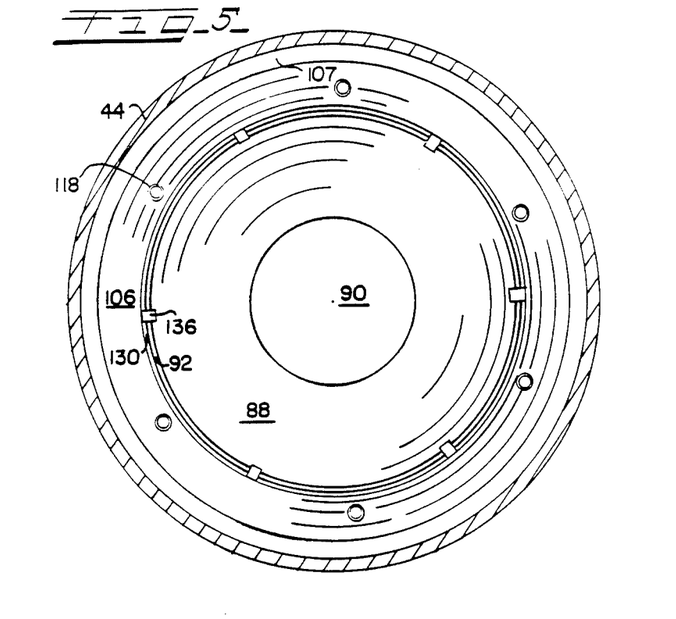
FIG. 5 is an enlarged cross-sectional top view of the ebullated bed reactor equipped with a circular vapor collector with conduits and hooks positioned about the vapor collector in accordance with the principles of the present invention.

As shown in FIG. 5, a symmetrical circular array of vertical conduits, bleed lines, rigid pipes, or risers 118 provide vapor passageways. The vapor passageways transport the vapors and gas bubbles from the pocket 116 (FIG. 2) of the vapor collector 105 to the vapor space 124 above the liquid level 54.

Conduit diameter can be an important factor in the design of the vapor collector 105. If the diameters of the conduits are too large, excess liquid can flow through the conduits 118 imparing gas disengagement and liquid/gas separation and increasing gas holdup. High liquid rates flowing through the conduits 118 can also transport too much liquid into the vapor space 124. When liquid rate exceeds the rate of product withdrawal through the product outlet line 64, liquid can understandably flow back to the recycle pan 88 in a direction opposite the gas flow and gas disengagement.

Calculations showed that less than 20% of the liquid flowed through four two-inch conduits 118. This rate increased to over 40% when the diameter of the four conduits 118 was expanded to three inches. At the same time, calculated gas holdup in the risers dropped from 62 volume percent to 47 volume percent.

Each conduit 118 (FIG. 3) can have a lower section 120, an elongated intermediate section 119 and an optional upper open ended section or adapter 122 for attachment to supports. The lower section 120 has a smaller diameter than the adapter 122. These adapters 122 can comprise short cups with a diameter larger than the intermediate section 119 of conduit 118, such as about double that of the intermediate section 119. The adapters 122 can be useful to limit liquid splashing in the vapor space 124 and thus reducing the potential for re-entrainment of the gas.

The lower section 120 (FIG. 3) of the conduit 118 is welded or otherwise securely connected to and extends upwardly from the upper portion 108 of the skirt 106 to a vapor space 124 above the liquid level 54 (FIG. 2) of the oil feed. The conduits 118 pass the vapor and gas bubbles caught in the pocket 116, to the vapor space 124 in proximity to the top 49 of the vessel 44. This minimizes entrainment and gas holdup of gas bubbles in the oil in the reaction zone 52 and increases the effective volume of the reaction zone 52 by decreasing internal gas recycle.

The lower section 120 (FIG. 3) of the conduit 118 does not extend below the skirt 106, in order to: (1) provide a smoother uninterrupted flow pattern of the oil feed, (2) prevent coking, accumulation of asphaltines, catalysts, and other solids near the lower section 120 of the conduit 118, and (3) avoid creating an internal cylindrical baffle in the pocket 116 which would occupy valuable reactor volume, cause undesireable deflection, and interrupt the efficiency of the vapor collector 105.

It was originally expected that a vapor collector 105 without conduits would perform about the same or worse than reactors equipped with only a recycle pan, (i.e. without a skirt) and without the vapor collector 105. It was unexpectedly and surprisingly found, however, that the vapor collector 105 without conduits exhibited much better results than a reactor equipped with only a recycle pan. Through the addition of the skirt 106, vapor collector 105, and pocket 116, about 8 volume percent less gas entered into the downcomer 78. The passage 107 provided a channel or pathway along the vessel 44 wall 45 where the vapor or gas promoted channeling of the vapor and allowed the vapor to bypass the recycle pan 88 and flow directly to the vapor space 124 at the top 49 of the vessel 44.

Furthermore, it was unexpectedly and surprisingly found that partial plugging of conduits 118 was not substantially detrimental to gas disengagement and gas holdup reduction until all of conduits 118 were blocked because substantial gas disengagement and reduction of gas holdup occurred in the pocket 116 of the vapor collector 105. The vapor collector 105 without conduits or with plugged conduits allowed about 4 volume percent more gas into the downcomer (recycle line) 78 than a vapor collector 105 with two or four open conduits 118.

It was also found that increasing the number of conduits 118 is similar to increasing conduit diameter because the total cross-sectional area of the conduits increases. When this area becomes too great, gas entrainment gets worse. Since it is important that the total cross-sectional area of the conduits 118 be small enough to prevent substantial passage of liquids (reactor oil), the number of conduits 118 should be increased only if conduit 118 diameter can be decreased in compensation.

Preferably, the total cross-sectional area of all of the conduits 118 should be less than 1.5% of the cross-sectional area of the vessel 44 for best results. Each conduit 118 should also have a sufficient inner diameter to avoid plugging or clogging by catalyst, coke, etc.

While the illustrative embodiments are preferred for the best results, it may be desireable in some circumstances to have: (1) more or less than six conduits extending above the skirt; (2) staggering or varying the heights of the conduits above the skirt; (3) staggering the distances the conduits are spaced from the center of the skirt; or (4) extending one or more of the conduits below the skirt.

Figure 3:
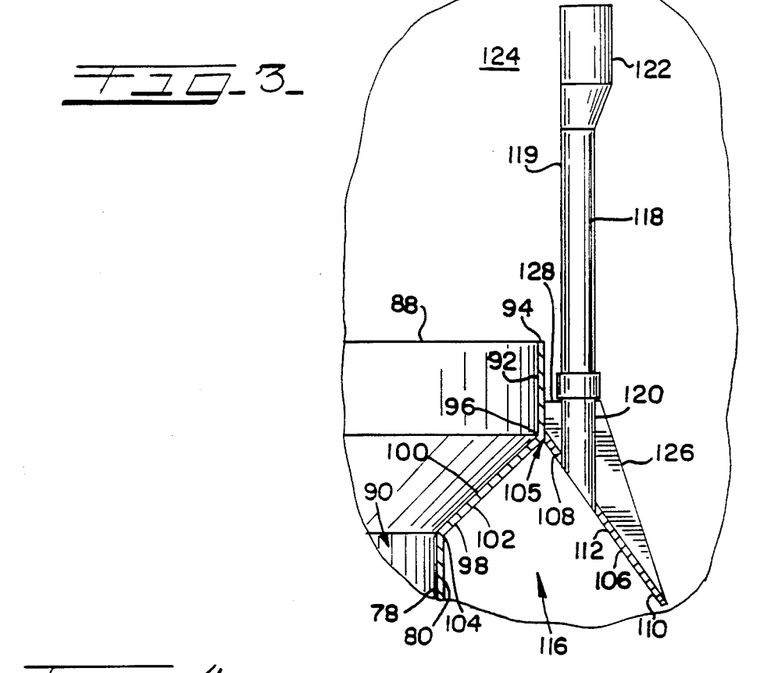
FIGS. 3 and 4 are enlarged partial-cross sectional views of other embodiments of the vapor collector in accordance with the principles of the present invention.

Referring to FIG. 3, ribs or reinforcing struts 126 and 128 can be utilized to stabilize and secure each conduit 118 to the skirt 106. The lower struts 126 are generally triangular and extend between and securely connect the lower section 120 of conduit 118 to the upper portion 108 of the skirt 106. The upper strut 128 extends between and securely connects the lower section 120 of conduit to the upright wall 92 of the recycle pan 88.

Figure 4:
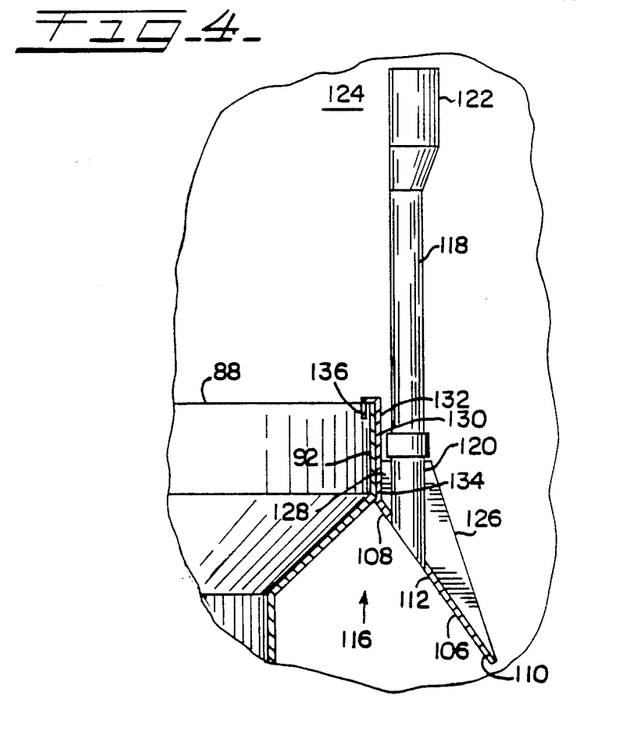

FIG. 4 illustrates another embodiment of the vapor collector 105. In FIG. 4, the upper portion 108 of the skirt 106 includes an annular upright wall 130, which has a slightly larger diameter than the upright wall 92 of the recycle pan 88, to simplify the retrofitting and attachment of the skirt 106 to the recycle pan 88. The upright skirt wall 130 is positioned against the pan wall 92 in abutting relationship. The upright wall 130 of the skirt 106 has an upper portion 132 and a lower portion 134. The upper wall portion 132 has a hook or inverted J-shaped finger 136 for attaching the inwardly facing surface of the upright skirt wall 130 to the exterior surface of the upright pan wall 92. The lower portion 134 of the upright skirt wall 130 is attached to the upper strut 128 for stabilization and enhanced structural strength and integrity.

In the embodiment of FIG. 5, the recycle pan 88 and the skirt 106 have a circular periphery. Six concentric conduits 118 extend upwardly from the skirt 106. Each of the conduits 118 is spaced the same distance from the center of the skirt 106. Having more than one conduit minimizes the chances of clogging, plugging, and blocking of the conduits 118 from solids, such as coke. The skirt 106 has six hooks 136 to attach the upright circular wall 130 of the skirt 106 to the upright wall 92 of the recycle pan 88. The circular skirt can be fabricated from multiple skirt sections.

Figure 6:
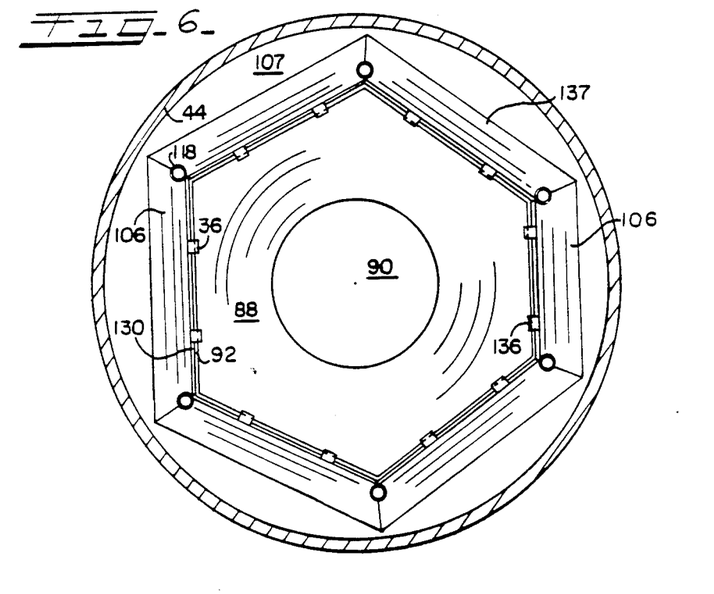
FIG. 6 is an enlarged cross-sectional top view of the ebullated bed reactor equipped with a hexagonal-shaped vapor collector with conduits and hooks positioned about the vapor collector in accordance with the principles of the present invention.

In the embodiment of FIG. 6, the recycle pan 88 and skirt 106 have a hexagonal periphery and comprise six symmetrical skirt sections 137. Six concentric conduits 118 extend upwardly from the skirt 106. The skirt 106 has 12 hooks 136 to attach the upright hexagonal wall 130 of the skirt to the upright hexagonal wall 92 of the recycle pan 88. It can be readily seen that other generally polygonally shaped skirts fall within the scope of the present invention. The embodiment illustrated in FIG. 6 is similar structurally and functionally to that of FIG. 5 in other respects.

Figure 7:
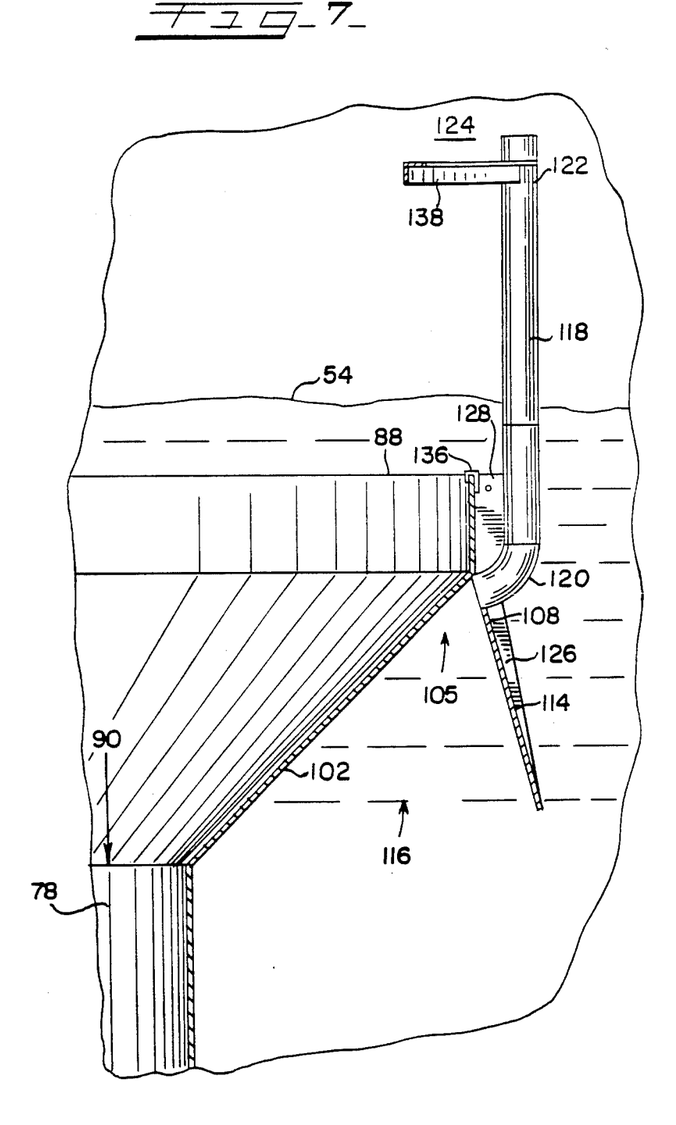
FIG. 7 is an enlarged cross-sectional view of part of the ebullated bed reactor equipped with a vapor collector with a J-shaped conduit in accordance with the principles of the present invention.

The vapor collector 105 of FIG. 7 has a generally J-shaped conduit 118 with a curved arcuate lower section 120. The curved lower section 120 of the conduit 118 extends outwardly and upwardly from the upper portion 108 of the upper skirt surface 114. The J-shaped conduit forms a generally J-shaped passageway for the vapor and reactor oil to freely flow up to the vapor space 124. The lower section 120 of conduit 118 is attached to the upright wall 92 of the recycle pan 88 by the upper strut 128 and hook 136, and is also attached to the upper skirt surface 114 of the skirt 106 by the lower strut 126.

The upper section 122 of the J-shaped conduit 118 (FIG. 7) can be attached to adjacent conduits by a stablizing bar 138 for mechanical strength and integrity. The stabilizing bar 138 is cantilevered tangentially and horizontally from the upper section 122 of the J-shaped conduit 118.

In use, a hydrotreating catalyst is fed through the catalyst feed line 56 (FIG. 2) into the reaction zone 52 of the ebullated bed reactor 10 to form a catalyst bed 58. Then, the ebullated bed reactor 10 is substantially filled to a preselected height to a liquid level 54 below the top 49 of of the vessel 44. This is accomplished by feeding an oil and gas feed comprising residual oil and hydrogenrich gas to the vessel 44 through the feedline 50. The residual oil can be diluted with gas, oil or other diluents.

Thereafter, the oil and hydrogen-rich gases are ebullated, mixed and reacted in the reactor 10 with each other together with and in the presence of the hydrotreating catalyst, under hydrotreating conditions to produce upgraded oil. Typical hydrotreating conditions include: a hydrotreating temperature ranging from about 700° F. to about 850° F., a hydrotreating total pressure ranging from about 2550 psia to about 3050 psia, a hydrogen partial pressure ranging from about 1600 psia to about 2300 psia, and a Liquid Hourly Space Velocity (LHSV) ranging from about 0.15 to about 0.7 $HR^{-1}$.

During hydrotreating, the height of the catalyst bed 62 is expanded.

Concurrently, a substantial amount of vapor or gas bubbles emitted in the reaction zone 52 from the oil feed is separated from the recycle liquid (reactor oil) to minimize gas entrainment and reduce gas holdup in the reaction zone 52 in order to increase the yield of upgraded oil. This is accomplished by the following: (1) Some of the rising vapor (gas bubbles) is deflected at a generally upward and inward angle of inclination with the bottom skirt surface 112 of the substantially frustroconical flared annular skirt 106 extending downwardly and outwardly from the recycle pan 88; to a position above the expanded catalyst bed 62; (2) Other rising vapor is deflected generally upwardly and outwardly at an angle of inclination with the inwardly sloping deflecting pan wall or outer surface 102 of the recycle pan 88; (3) The vapor is then caught and collected in the inverted V-shaped annular pocket 116 at the intersection of the upper skirt surface 114 and the outer surface 102 of the recycle pan 88; and (4) The vapor is passed substantially upwardly through a set of vapor risers, conduits, or bleed lines 118 into a vapor space 124 above the liquid level 54 in the reactor 10. The collected vapor can be discharged from the reactor through an overhead gas outlet line 140 (FIG. 2).

The vapor can be conveyed in a generally J-shaped flow pattern to the vapor space 124 above the liquid level 54 by J-shaped conduit 118 (FIG. 7).

Concurrently, the reactor oil and gas feed is circulated, recycled, directed and passed generally downwardly through the central circular passageway 90 (FIG. 2) of the recycle pan 88 through the downcomer (recycle line) 78 to the ebullating pump 68. The oil and gas feed in the bottom section 70 of the vessel 44, in proximity to the ebullating pump 68, is circulated gernerally upwardly through the distributor plate 72 by way of a multiplicity of bubble-caps 74 and risers 76 which help to evenly distribute the oil and the gas across the reaction zone 52. The upgraded oil from the ebullated bed reactor 10 is withdrawn through the product outlet or withdrawal line 64.

In a series of tests conducted with equipment and under process conditions, similar in many respects to those shown in FIG. 2 and described above, it was found that the vapor collector reduced gas holdup in the downcomer by about 10-12 volume percent, reduced gas holdup in the reaction zone by about 4-5 volume percent, and significantly reduced gas holdup in the recycle liquid (reactor oil) in the downcomer by about 10 volume percent.

Decreasing gas entrainment reduces pressure head requirements of the ebullating pump and pump speed. Reducing gas holdup in the downcomer can lower the required pump speeds by about 200 to 400 RPM. This brings pump speeds closer to the mid-range and provides more flexibility for either decreasing or increasing liquid recycle rates. It also extends the stable flow limit by at least 60%, which helps to avoid regimes where bed level control becomes erratic due to unstable recycle flow.

The vapor collector and process can increase resid conversion, such as by about 2% or more, because of the greater liquid volume available for thermal reactions. The vapor collector and process can also extend the range where stable liquid recycle rates can be maintained, such as by 60% or more, and provide for better control of the catalyst bed level in order to attain better process efficiency and product yield. The vapor collector can also be used in downstream separators.

Although embodiments of this invention have been shown and described, it is to be understood that various modifications and substitutions, as well as rearrangements and combinations of process steps and equipment, can be made by those skilled in the art without departing from the novel spirit and scope of this invention.

What is claimed is:

1. An ebullated bed reactor, comprising:
    a vessel having a lower portion and an upper portion;
    oil feed means for feeding an oil feed comprising oil and hydrogen rich gases into said vessel;
    fresh catalyst feed means for feeding fresh hydrotreating catalyst into said vessel;
    ebullating pump means located in the lower portion of said vessel for circulating said feed in said vessel in the presence of said catalyst to hydrotreat said oil;
    a tubular downcomer extending generally upward above said pump means, said downcomer having an upper end and a lower end in proximity to said pump means;
    a stationary tubular pan connected to said upper end of said downcomer in said upper portion of said vessel for facilitating flow of said feed into said downcomer; and an annular skirt connected to said pan and extending downwardly and outwardly therefrom for collecting vapor comprising excess hydrogen, light hydrocarbon gases, hydrogen sulfide, ammonia, and steam, emitted in the reaction zone.

2. An ebullated bed reactor in accordance with claim 1 further comprising at least one conduit connected to the upper and inner portion of said annular skirt and extending generally upwardly therefrom to a space above said height of said liquid oil in the reaction zone of said vessel for separating a substantial portion of said vapor in the reaction zone.

3. An ebullated bed reactor in accordance with claim 2 wherein said pan has an upper surface and generally downwardly converging walls to catch and direct said oil through said downcomer; and said pan has a lower surface extending upwardly generally to catch and direct said vapor in the reaction zone upwardly through said conduit.

4. An ebullated bed reactor in accordance with claim 1 wherein said skirt cooperates with said pan to define a frustroconical V-shaped inverted pocket for trapping and receiving vapor as it rises in said reaction zone.

5. An ebullated bed reactor in accordance with claim wherein said skirt is generally polygonal.

6. An ebullated bed reactor, comprising:

a vessel having a lower portion and an upper portion providing a top;

oil feed means for feeding an oil feed comprising resid oil and hydrogen-rich gases into said vessel, said feed having a maximum height and liquid level spaced below said top;

fresh catalyst feed means for feeding fresh hydrotreating catalysts into said vessel to form a catalyst bed in said vessel;

ebullating pump means located in the lower portion of said vessel for controlling and circulating said feed in said vessel and expanding said catalyst bed, said pump means ebullating reactor oil comprising said oil feed in the presence of said catalyst to produce upgraded oil;

a stationary tubular downcomer extending generally upward above said pump means, said downcomer having an upper portion and a lower portion in proximity to said pump means;

a stationary annular recycle pan fixedly attached to and above said upper portion of said downcomer in said upper portion of said vessel;

an inclined skirt attached to an outer portion of said pan and extending outwardly and downwardly therefrom; and at least one conduit attached to said skirt in proximity to said pan, said conduit extending upwardly from said skirt above said liquid level of said oil feed when said catalyst bed is expanded for facilitating the separation of vapor comprising excess hydrogen, light hydrocarbon gases, hydrogen sulfide, ammonia, and steam emitted from said upgraded oil in said reactor.

7. An ebullated bed reactor in accordance with claim 6 wherein a lower surface of said pan sidewalls and said skirt define a generally frustroconically shaped pocket and vapor collector to catch, direct, and separate vapor from said reactor oil.

8. An ebullated bed reactor in accordance with claim 6 wherein said skirt is generally circularly shaped as viewed from the top of said vessel.

9. An ebullated bed reactor, comprising:

an upright elongated vessel defining a reaction zone and having an upright wall, a lower portion and an upper portion providing a top;

oil feed means for feeding an oil feed comprising resid oil and hydrogen-rich gases into the lower portion of said vessel, said oil feed having a maximum height and liquid level in said vessel spaced below said top;

said vessel defining a vapor space between said liquid level and said top;

fresh catalyst feed means for feeding fresh hydrotreating catalysts into said vessel to form a catalyst bed in said vessel;

ebullating pump means located in the lower portion of said vessel for controlling, circulating and recycling reactor oil comprising said oil feed and expanding said catalyst bed in said vessel, said pump means ebullating said oil feed in the presence of said catalyst to produce upgraded oil;

an elongated stationary tubular downcomer extending generally upward above said pump means, said downcomer having an upper portion with an inner surface and an outer surface;

a stationary annular recycle pan, said pan being generally funnel-shaped and having a substantially circular upright wall with a top portion and bottom portion, said pan having an annular inwardly sloping deflecting wall extending downwardly at an angle of inclination from said bottom portion of said upright wall, and a bottom edge being fixedly attached to said upper portion of said downcomer;

a substantially frustroconical flared annular skirt, fixedly attached to said bottom edge of said circular upright wall of said pan and extending downwardly and outwardly therefrom to a position spaced from the upright wall of said vessel, said skirt having a downwardly facing surface providing a deflector for deflecting vapor comprising excess hydrogen, light hydrocarbon gases, hydrogen sulfide, ammonia, and steam, emitted in said reaction zone at an angle of inclination, said deflector cooperating with said inwardly sloping wall of said pan to define an annular inverted V-shaped bubble-receiving pocket for catching, trapping, and receiving a substantial amount of vapor emitted in said reaction zone and for deflecting said vapor;

a substantially symmetrical circular array of substantially similar conduits comprising vapor bleed lines, said bleed lines defining vapor passageways, said vapor bleed lines extending upwardly from said skirt from a position adjacent to said bottom portion of said pan to said vapor space above said liquid level of said reactor oil for passing said vapor caught in said pocket to said vapor space to substantially minimize entrainment of said vapor in said upgraded oil and increase the production of upgraded oil in said vessel; and said skirt, pan and conduits cooperating with each other to provide a vapor collector and two stage separator for substantially separating and disengaging vapor from said reaction zone.

10. An ebullated bed reactor in accordance with claim 9 wherein said conduit is generally J-shaped.

11. An ebullated bed reactor in accordance with claim 9 wherein each of said bleed lines is attached together by stabilizer bars.

12. An ebullated bed reactor in accordance with claim 9 wherein said skirt has an annular upright wall connected to said upright wall of said pan.

13. An ebullated bed reactor in accordance with claim 9 wherein said pan has an upper edge and said skirt includes a plurality of hooks extending upwardly for hooking said upper edge of said pan.

14. An ebullated bed reactor in accordance with claim 9 wherein said bleed line comprises a plurality of upright risers, said risers having a top portion and a bottom portion and the diameter of the top portion being substantially greater then the diameter of said bottom portion.

15. An ebullated bed reactor in accordance with claim 9 wherein said skirt includes substantially triangular ribs extending between and connecting said bleed lines and said skirt.

16. An ebullated bed reactor in accordance with claim 9 wherein said skirt extends radially outwardly to a location spaced inwardly of the upright wall of said vessel, said pan providing a second stage separator to further enhance separation of said vapor from liquid comprising said oil.

17. An ebullated bed reactor in accordance with claim 16 wherein said pan has a diameter less than the diameter of said skirt and said vessel, said pan providing a second stage separator to further enhance separation of said vapor from liquid comprising said oil.

18. An ebullated bed reactor in accordance with claim 9 wherein said skirt is generally octagonally shaped.

19. An ebullated bed reactor in accordance with claim 9 wherein said vapor collector comprises a first stage separator and said skirt extends downwardly and radially outwardly at an angle of inclination ranging from about 5° to 45° in relation to the vertical axis.

20. An ebullated bed reactor in accordance with claim 9 wherein said angle of inclination of said deflecting wall of said pan ranges from about 30° to 60° in relation to the vertical axis.

* * * * *